Dec. 20, 1966   R. H. SICKING   3,293,658
AUTOMATIC FEED PENCIL APPARATUS
Filed Dec. 23, 1964   2 Sheets-Sheet 1

INVENTOR
ROBERT H. SICKING
BY Harry A. Herbert Jr. and Louis E. Hay
ATTORNEYS 3,293,658
Patented Dec. 20, 1966

3,293,658
AUTOMATIC FEED PENCIL APPARATUS
Robert H. Sicking, 5705 Itaska, St. Louis, Mo. 63109
Filed Dec. 23, 1964, Ser. No. 420,844
13 Claims. (Cl. 346—139)

The invention described herein may be manufactured and used by or for the United States Government for governmental purposes without the payment to me of any royalty thereon.

This invention relates to apparatus for advancing expendable cylindrical material, such as pencil lead, through a holding chuck; and more specifically to such apparatus adapted for use on data plotters and other machines used to draw lines by remote control.

The present pencil apparatus finds particular application on electronic data plotters such as manufactured by Electronic Associates Inc. These machines are extensively used for producing contour maps, road maps, weather maps, engineering drawings and a variety of charts such as statistical charts. The usual practice, when the chart is produced on paper, is to use inking devices on the machine. If the chart is to be produced on opaque coated film, a stylus is used to engrave the film.

For many uses on paper, ordinary carbon lead on paper would be preferable to ink, and has often been tried, but without complete success. Prior attempts to use lead have pointed out problem areas including (1) the difficulty of maintaining contact with the receiving media as the lead wears, (2) the difficulty of advancing the lead in the chuck during normal consumption, (3) the problem of broken lead, (4) the problem of the data plotter continuing to move after the lead is expended, (5) the requirement of an attendant to assure that the plotter is functioning properly, and (6) the backlash problem in available mechanisms which made it difficult to repeatedly position the pencil on drawing media for high accuracy plotting.

The invention to be presently disclosed is the composite result of creating a pencil apparatus which will eliminate or greatly reduce the above named problems, and which will permit the making of penciled charts in those cases where such charts are preferable over those made with ink or with a stylus.

One object of the present invention is to provide a pencil apparatus particularly suited for use on automatic electronic data plotters.

Another object of this invention is to provide an automatic feed pencil apparatus having means for keeping the end of the lead protruding from the chuck within prescribed axial limits.

A further object of the present invention is to provide an automatic feed pencil apparatus for use on data plotters, and having means thereon for generating a signal when the contained lead is regarded as being expended; the signal being useful for stopping the data plotter.

Yet another object of the present invention is to provide an automatic feed pencil apparatus having means for showing the amount of unexpended lead therein.

A still further object of the present invention is to provide a pencil apparatus for use on data plotters in which the lead may be renewed in an easy manner and without disturbing the data plotter.

And yet another object of the present invention is to provide a pencil apparatus for use on data plotters and having a cushioning biasing means for maintaining pressure on the lead when engaging the media being contacted.

And yet a further object of the present invention is to provide a pencil apparatus for use on data plotters and which does not require manual attention other than to renew the lead.

Another object of the present invention is to provide an automatic feed pencil apparatus in which it is necessary to interchange only a single element in order to use a different diameter lead, or one of a different hardness or color.

Additional objects, advantages and features of the invention reside in the construction, arrangement and combination of parts involved in the embodiments of the invention as will appear from the description and accompanying drawings, wherein FIG. 1 through FIG. 6 depict one embodiment of the invention adapted for attaching to an element of the plotting head on a data plotter;

FIG. 1 being a plan view of the pencil apparatus,

FIG. 2 being a rear elevation of FIG. 1,

FIG. 3 being a front elevation along line 3—3 on FIG. 1,

Figure 1:
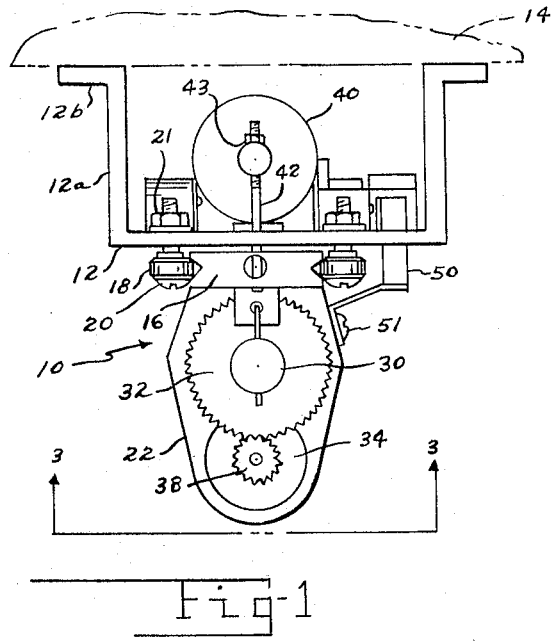
Figure 2:
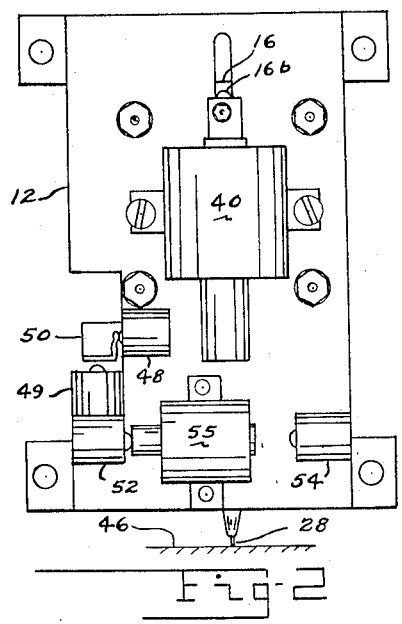

Referring specifically to FIG. 1—FIG. 4, the apparatus constituting this invention will be referred to as pencil apparatus 10. This pencil apparatus 10 has a vertical base member 12 which provides the support for the balance of the apparatus. The vertical base member is provided with a mounting bracket 12a extending rearward from each corner and terminating in a foot 12b for attaching to a member of the data plotter 14 as shown on FIG. 1. The actual attachment may be made by screws (not shown) or any other convenient fastening means. The mounting brackets 12a are of sufficient length to provide clearance for the elements mounted on the rear face of the vertical base member, as shown on FIG. 1 and FIG. 4.

Figure 3:
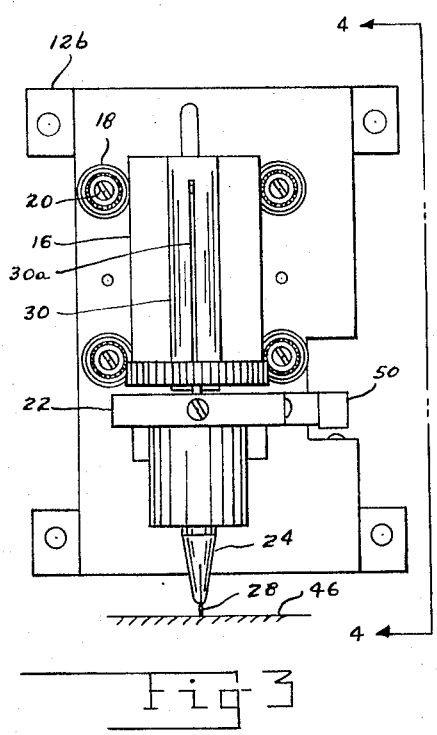
Figure 4:
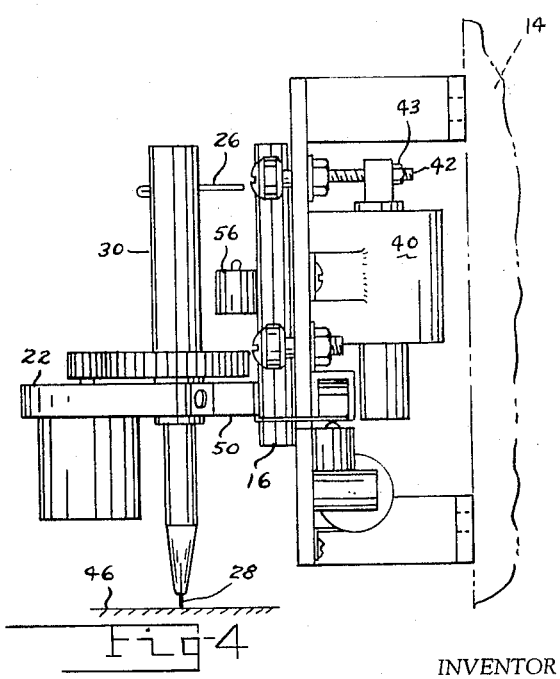
FIG. 4 is a side elevation along line 4—4 on FIG. 3.

A sliding support member 16 is supported for vertical sliding movement at the front face of the vertical base member 12 through the engagement of four precision ball bearings 18 which ride in vertical V-grooves in the sides of the support member 16 as best shown on FIG. 1 and FIG. 3. Each bearing is retained by a cam action support stud 20 having a shank horizontally extending through the vertical base member 12, where it is retained by nut 21. The cam action support stud is of the well known design in which the portion passing through the bore in the bearing is eccentric with the shank, so that rotating the shank will change the lateral position of the bearing. By the use of precision bearings and ground V-grooves, an extremely free-rolling mechanism is provided which has the required sensitivity for accurate lead control.

A support platform 22 is joined at the bottom portion of the sliding support member 16 and extends forward at substantially right angle. As best shown on FIG. 5, the support platform 22 contains a vertical threaded bore for receiving the upper threaded portion of the lead holding chuck 24 which has an axial bore therethrough and terminates at the lower end in a conventional finger jaw for appylying a slight retention force on the lead. The bore is of proper size to permit the free axial movement of the lead 28 and is internally threaded to receive the lead advance screw 26.

Figure 5:
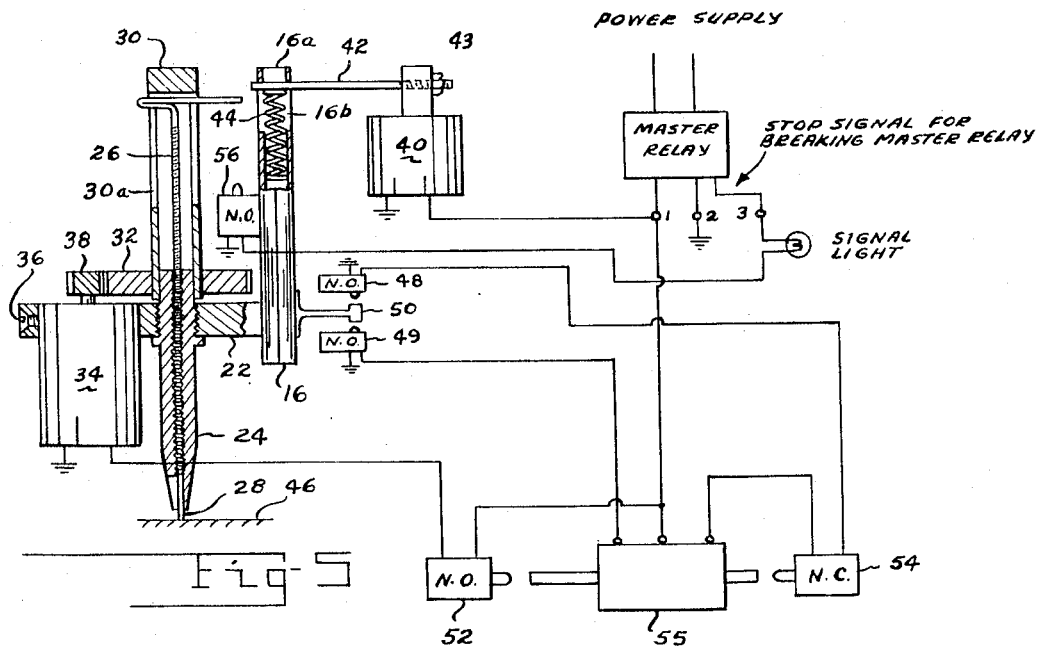
FIG. 5 is a vertical section through a portion of the apparatus showing construction details of the lead holding chuck and lead advance screw, and further showing a wiring schematically for the apparatus.

An actuating thimble 30 is removably joined to the upper protruding end of the lead holding chuck 24 as best shown on FIG. 5. The actuating thimble is provided with two longitudinal slots 30a which are spaced to be 180° apart. The upper end of the lead advance screw 26 is folded to form a substantially T shape structure with the crossed portion of the T slidably engaging the longitudinal slots in the actuating thimble, as best shown on FIG. 5. A driven gear 32 is coaxially joined to the actuating thimble to be axially located near the open end of the actuating thimble. An electric motor 34 extends through a bore in support platform 22, where it is retained in position by screw 36. A drive gear 38 is joined to the protruding armature shaft of motor 34 and engages driven gear 32 joined to the actuating thimble 30. The motor, through the gears, thus rotates the actuating thimble which in turn rotates the lead advance screw into the lead holding chuck to thereby expel the lead. If desired, suitable means may be provided to prevent premature disengagement of the actuating thimble from the lead holding chuck. One method would be to provide spring clips joined to the support platform and engaging the upper face of driven gear 32, thus preventing upward crawl of the thimble. It has been found however, that if the elements have proper tolerance, the weight of the gear and the thimble is sufficient to prevent crawl.

The lead is renewed by detaching the actuating thimble from the lead holding chuck, unscrewing the lead advance screw and then inserting the new lead. The lead advance screw is then replaced and is screwed into the lead holding chuck a sufficient distance to expel the stub of old lead and to protrude the new lead from the chuck. The actuating thimble with attached gear is then placed in position, and the apparatus is again functional.

The balance of this disclosure will be concerned with the elements necessary to make the pencil apparatus function in accordance with the stated objectives. A power solenoid 40, having a spring loaded plunger in a normally upward extended position, is mounted on the rear face of the vertical base member 12. As best shown on FIG. 5, the sliding support member 16 has a blind bore 16a extending downward from the upper end on substantially the vertical center line thereof, and a transverse elongated slot 16b passing through the blind bore 16a. An actuating rod 42 has a first end in threaded transverse engagement with the plunger rod of solenoid 40 where it is locked in position by nut 43, and a second end forwardly extending through a convenient aperture (not shown) in the vertical base member 16 to engage the transverse elongated slot 16b in the sliding support member 16. As shown on FIG. 5, a compression spring 44 is contained within the blind bore 16a of the sliding support member to be disposed between the bottom of the blind bore and actuating rod 42. When the plunger rod of solenoid 40 is in its normal extended position, the actuating rod 42 will lift the sliding support member 16 and all elements joined thereto. When the solenoid is energized to pull the plunger rod down, the sliding support member and all elements joined thereto are lowered until the extended end of lead 28 engages the media 46 on which the chart is to be produced. The overtravel of the plunger rod in the solenoid is absorbed by the compression spring to provide a cushioned biasing means maintaining pressure on the end of the lead. Solenoid 40 is used to actuate the engagement and disengagement of the pencil apparatus in relation to the media on which the chart is to be drawn.

Figure 6:
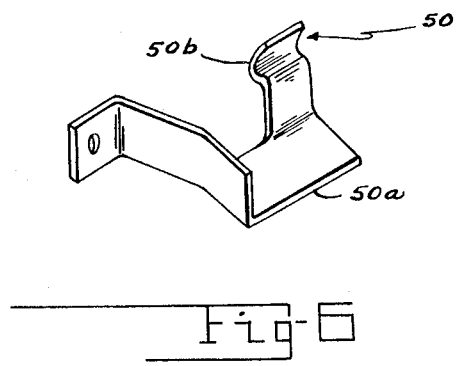
FIG. 6 is a perspective of the motor switch actuator.

The next elements to be described are directly involved in advancing the lead as it becomes expended. The first portion to be described is the elements for establishing the upper and lower position limits of the sliding support member 16 and the elements joined thereto. As best shown on FIG. 2, and in schematic on FIG. 5, two normally open micro switches 48 and 49 are mounted in properly spaced vertical relationship on the rear face of the vertical base member 12. A switch actuator 50, joined to support platform 22 by screw 51 as best shown on FIG. 1, extends to be between the two microswitches. The switch actuator 50 is substantially of the configuration shown on FIG. 6; the horizontal portion 50a actuating microswitch 49, and the vertical portion 50b actuating microswitch 48. As will be more fully explained hereinafter, as the lead extending from the lead holding chuck wears away, the moving elements of the apparatus move downward until the switch actuator closes the microswitch 49 to close the electrical circuit to the motor. The motor then operates to extend the lead from the chuck, which being in contact with media 46, causes the moving elements of the apparatus to move upward until the switch actuator closes the microswitch 48 to break the electrical circuit to the motor.

In addition to microswitches 48 and 49, and switch actuator 50, the motor actuating circuit also includes, as best shown on FIG. 5, a normally open microswitch 52, a normally closed microswitch 54, and an actuating solenoid 55. The actuating solenoid is mounted between the two microswitches and is of the type in which the plunger extends through both ends and which has an integral holding means for holding the plunger in one axial position (without current) until the solenoid is energized to drive the plunger in the opposite direction. If desired, a conventional double acting solenoid may be used, and the position retention accomplished by friction devices acting against the protruding plunger of the solenoid. One example of such a friction device is the conventional spring loaded detent device.

Referring specifically to FIG. 5, as the lead wears away, the moving elements of the apparatus descend until the switch actuator 50 closes the normally open microswitch 49 to close the circuit to the actuating solenoid 55. The plunger in the solenoid then moves to the left and closes the normally open microswitch 52 to complete the circuit to the motor 34. The motor causes the lead to be extended, and as the moving elements of the apparatus commence to move upward, the microswitch 49 returns to its normally open position to break the circuit to the solenoid 55. The solenoid, because of the integral holding device, continues to hold microswitch 52 in its closed position and the motor continues to operate. The lead continues to be extended until the switch actuator closes the normally open microswitch 48. This energizes the actuating solenoid causing the plunger to move to the right, thus permitting microswitch 52 to return to its normally open position to break the circuit to the motor, while at the same time opening the normally closed microswitch 54 to break the circuit to the solenoid. The integral holding device will again hold the solenoid in this position until the solenoid is energized to drive the plunger in the opposite direction. The circuitry is now inactive until enough lead is worn away to again permit the switch actuator to close the normally open microswitch 49.

The final circuit used on the apparatus is to activate a signal to indicate when the lead is expended; the same signal also being used to stop the data plotter until the lead is renewed and the data plotter again made operable. This circuit is shown on FIG. 5 and has a sensitive normally open microswitch 56 mounted to a stationary member of the apparatus, such as the sliding support member 16. This microswitch is positioned where it may be actuated by the transversely extending portion of the lead advance screw 26. The microswitch is positioned where it will be actuated when the lead remaining in the apparatus is worn to a predetermined length. When the microswitch is closed, the signal light comes on, and the master relay stops the data plotter through circuitry not necessary to the apparatus constituting this invention.

It is to be understood that the embodiment of the present invention as shown and described is to be regarded as illustrative only and that the invention is susceptible to variations, modifications and changes within the scope of the appended claims.

I claim:

1. A pencil apparatus for advancing a lead contained therein and comprising: a base member, a sliding support member movably supported for linear movement on said base member and having an extending support platform containing a bore therethrough substantially parallel to the linear movement of said sliding support member on said base member, an elongated lead holder joined to the platform on said sliding support member and having a first end extending through the bore in said sliding support member and a second end extending therefrom, said lead holder further having an axial bore therethrough for containing the lead and being internally threaded at the first end portion and terminating at the second end in chuck means for resisting the free axial protrusion of the lead, a lead advance screw having a first end in threaded engagement with the threaded end of said lead holder to be in abutment with the inner end of the lead and a second end extending from said lead holder, and actuating means joined to said apparatus and engaging the extending second end of said lead advance screw for rotating said lead advance screw in said lead holder and thereby advance the end of the lead protruding from the chuck means on the second end of said lead holder.

2. A pencil apparatus for advancing a lead contained therein and comprising: a base member, a sliding support member movably supported for linear movement on said base member and having an extending support platform containing a bore therethrough substantially parallel to the linear movement of said sliding support member on said base member, an elongated lead holder joined to the platform on said sliding support member and having a first end extending through the bore in said sliding support member and a second end extending therefrom, said lead holder further having an axial bore therethrough for containing the lead and being internally threaded at the first end portion and terminating at the second end in chuck means for resisting the free axial protrusion of the lead, biasing means joined to said base member and engaging said sliding support member for biasing said sliding support member in the direction of the chuck means on said lead holder, a lead advance screw having a first end in threaded engagement with the threaded end of said lead holder to be in abutment with the inner end of the lead and a second end extending from said lead holder, actuating means joined to said apparatus and engaging the extending second end of said lead advance screw for rotating said lead advance screw in said lead holder and thereby advance the end of the lead protruding from the chuck means on the second end of said lead holder, and control means cooperatively joining said sliding support member and said actuating means for intermittently starting and stopping said actuating means for maintaining the lead protruding from said lead holder within predetermined length limits.

3. A pencil apparatus for advancing a lead contained therein and comprising: a base member, a sliding support member movably supported for linear movement on said base member and having an extending support platform containing a bore therethrough substantially parallel to the linear movement of said sliding support member on said base member, an elongated lead holder joined to the platform on said sliding support member and having a first end extending through the bore in said sliding support member and a second end extending therefrom, said lead holder further having an axial bore therethrough for containing the lead and being internally threaded at the first end portion and terminating at the second end in chuck means for resisting the free axial protrusion of the lead, biasing means joined to said base member and engaging said sliding support member for holding said sliding support member in the extreme position in the direction of the first end on said lead holder and for biasing said sliding support member in the direction of the chuck means on said lead holder, a lead advance screw having a first end in threaded engagement with the threaded end of said lead holder to be in abutment with the inner end of the lead and a second end extending from said lead holder, an actuating thimble the open end of which is rotatably and removably joined to the first end of said lead holder extending through the bore in the platform of said sliding support and engaging the extending end of said lead advance screw for rotating said lead advance screw in said lead holder and thereby advance the end of the lead protruding from the chuck means on the second end of said lead holder, a driven gear coaxially joined to said actuating thimble, a motor means joined to said sliding support and engaging said driven gear, and control means cooperatively joining said sliding support member and said motor means for intermittently starting and stopping said motor means for maintaining the lead protruding from said lead holder within predetermined length limits.

4. A pencil apparatus in accordance with claim 3 and having limit control means joined to said sliding support member and engaging said lead advance screw when the lead is worn to a predetermined length for preventing further starting of said motor means.

5. An automatic feed pencil apparatus for use on data plotting machines making charts on chart media and the like, said apparatus comprising: a vertical base member adapted for attaching to the plotting head of the data plotting machine, a sliding support member movably supported for vertical movement on said vertical base member and having a substantially horizontal support platform containing a vertical bore therethrough substantially parallel to the linear movement of said sliding support member on said base member, an elongated lead holder joined to the horizontal support platform on said sliding support member and having a first end upwardly extending through the bore in the horizontal support platform on said sliding support member and a second end extending downward, said lead holder further having an axial bore therethrough for containing the lead and being internally threaded at the first end portion and terminating at the second end in chuck means for resisting the free axial protrusion of the lead, biasing means joined to said base member and engaging said sliding support member for lifting said sliding support member and for biasing said sliding support member in the direction of the chuck means on said lead holder to bring the lead into biased engagement with the chart media, a lead advance screw having a first end in threaded engagement with the threaded end of said lead holder to be in abutment with the inner end of the lead and a second end extending upward from said lead holder, actuating means joined to said apparatus and engaging the extending second end of said lead advance screw for rotating said lead advance screw in said lead holder and thereby advance the end of the lead protruding from the chuck means on the second end of said lead holder, and control means cooperatively joining said sliding support member and said actuating means for intermittently starting and stopping said actuating means for maintaining the lead protruding from said lead holder within predetermined length limits.

6. An automatic feed pencil apparatus in accordance with claim 5 and in which said biasing means comprises:

a. a solenoid vertically mounted on said vertical base member and having a spring loading plunger normally extended in the upward position, and b. a substantially horizontal actuating rod having a first end joined to the upward extending plunger rod of said solenoid and a second end extending for engagement with said sliding support member.

7. An automatic feed pencil apparatus in accordance with claim 5 in which said sliding support member has a vertical blind bore open at the upper end thereof and an elongated vertical slot therethrough to intersect the vertical blind bore between the open end and the bottom of the bore, and in which said biasing means comprises:
   a. a solenoid vertically mounted on said vertical base member and having a spring loaded plunger normally extended in the upper position,
   b. a substantially horizontal actuating rod having a first end joined to the upward extending plunger rod of said solenoid and a second end extending for engagement in the elongated vertical slot in said sliding support member, and
   c. a compression spring within the vertical blind bore in said sliding support member disposed to be between the bottom of said vertical bore and said actuating rod.

8. An automatic feed pencil apparatus for use on data plotting machines making charts on chart media and the like, said apparatus comprising: a vertical base member adapted for attachment to the plotting head of the data plotting machine, a sliding support member movably supported for vertical movement on said vertical base member and having a substantially horizontal support platform containing a vertical bore therethrough substantially parallel to the linear movement of said sliding support member on said base member, an elongated lead holder joined to the horizontal support platform on said sliding support member and having a first end upwardly extending through the bore in the horizontal support platform on said sliding support member and a second end extending downward, said lead holder further having an axial bore therethrough for containing the lead and being threaded in the upper portion thereof while terminating at the lower second end in chuck means for resisting the free axial protrusion of the lead, biasing means joined to said base member and engaging said sliding support member for lifting said sliding support member and for biasing said sliding support member in the direction of the chuck means on said lead holder to bring the lead into biased engagement with the chart media, a lead advance screw having a first end in threaded engagement with the threaded end of said lead holder to be in abutment with the inner end of the lead and a second end extending upward from the first end of the lead holder, an actuating thimble the open end of which is rotatably and removably joined to the first end of said lead holder extending through the bore in said sliding support and engaging the extending second end of said lead advance screw for rotating said lead advance screw in said lead holder and thereby advance the end of the lead protruding from the chuck means on the second end of said lead holder, a driven gear coaxially joined to said actuating thimble, a motor means joined to said sliding support and engaging said driven gear, and control means cooperatively joining said sliding support member and said motor means for intermittently starting and stopping said motor means for maintaining the lead protruding from said lead holder within predetermined length limits.

9. An automatic feed pencil apparatus in accordance with claim 8 and having a limit control means joined to said sliding support member and engaging said lead advance screw when the lead is worn to a predetermined length for preventing further starting of said motor means.

10. An automatic feed pencil apparatus in accordance with claim 8 and in which said biasing means comprises:
   a. a solenoid vertically counted on said vertical base member and having a spring loaded plunger normally extended in the upward position, and
   b. a substantially horizontal actuating rod having a first end joined to the upward extending plunger rod of said solenoid and a second end extending for engagement with said sliding support member.

11. An automatic feed pencil apparatus in accordance with claim 8 in which said sliding support member has a vertical blind bore open at the upper end thereof and an elongated vertical slot therethrough to intersect the vertical blind bore betwen the open end and the bottom of the bore, and in which said biasing means comprises:
   a. a solenoid vertically mounted on said vertical base member and having a spring loaded plunger normally extended in the upper position,
   b. a substantially horizontal actuating rod having a first end joined to the upward extending plunger rod of said solenoid and a second end extending for engagement in the elongated vertical slot in said sliding support member, and
   c. a compression spring within the vertical blind bore in said sliding support member disposed to be between the bottom of said vertical bore and said actuating rod.

12. An automatic feed pencil apparatus for use on data plotting machines making charts on chart media and the like, said apparatus comprising: a vertical base member adapted for attaching to the plotting head of the data plotting machine, a sliding support member movably supported for vertical movement on said vertical base member and having a substantially horizontal support platform containing a vertical bore therethrough substantially parallel to the linear movement of said sliding support member on said base member, said sliding support member further having a vertical blind bore open at the upper end thereof and an elongated vertical slot therethrough to intersect the vertical blind bore between the open end and the bottom of the vertical blind bore, an elongated lead holder removably joined to the horizontal support platform on said sliding support member and having a first end upwardly extending through the bore in the horizontal support platform on said sliding support member and a second end extending downward, said lead holder further having an axial bore therethrough for containing the lead and being threaded in the upper portion thereof while terminating at the lower second end in chuck means for resisting the free axial protrusion of the lead, biasing means joined to said base member and engaging said sliding support member for lifting said sliding support member and for biasing said sliding support member in the direction of the chuck means on said lead holder to bring the lead into biased engagement with the chart media, said biasing means comprising a solenoid vertically mounted on said vertical base member and having a spring loaded plunger normally extended in the upper position, a substantially horizontal actuating rod having a first end joined to the upward extending plunger rod of said solenoid and a second end extending for engagement in the elongated vertical slot in said sliding support member, and a compression spring within the vertical blind bore in said sliding support member disposed to be between the bottom of said bore and said actuating rod, a substantially T-shaped lead advance screw having the downward extending element in threaded engagement with the threaded end of said lead holder to be in abutment with the inner end of the lead and with the crossed end extending upward from said lead holder, an elongated actuating thimble the open end of which is rotatably and removably joined to the first end of said lead holder extending through the bore in said sliding support and having longitudinal slots in the wall of said actuating thimble in sliding engagement with the crossed end of said lead advance screw for rotating said lead advance screw in said lead holder and thereby advance the end of the lead protruding from the chuck means on the second end of said lead holder, a driven gear coaxially joined to said actuating thimble a motor means joined to said sliding support and engaging said driven gear, and control means cooperatively joining said sliding support member and said motor means for intermittently starting and stopping said motor means for maintaining the lead protruding from said lead holder within predetermined length limits.

13. An automatic feed pencil apparatus in accordance with claim 12 and having a limit control means joined to said sliding support member and engaging the crossed end of said lead advance screw when the lead is worn to a predetermined length for preventing further starting of said motor means.

References Cited by the Examiner

UNITED STATES PATENTS 2,718,450   9/1955   Leonard et al. _____ 346—139 X

RICHARD B. WILKINSON, *Primary Examiner.*